(12) United States Patent
Ketelaer (10) Patent No.: US 9,908,209 B2
(45) Date of Patent: Mar. 6, 2018

(54) METHOD FOR MACHINING A WORKPIECE, SUPPLY CIRCUIT, SUPPLY SYSTEM, TOOL ACTUATOR, TOOL SETUP

(71) Applicant: SAUER ULTRASONIC GmbH, Stipshausen (DE)

(72) Inventor: Jens Ketelaer, Bingen am Rhein (DE)

(73) Assignee: SAUER ULTRASONIC GMBH, Stipshausen (DE)

( * ) Notice: Subject to any disclaimer, the term of this patent is extended or adjusted under 35 U.S.C. 154(b) by 0 days.

(21) Appl. No.: 14/437,431

(22) PCT Filed: Oct. 18, 2013

(86) PCT No.: PCT/EP2013/071861
§ 371 (c)(1),
(2) Date: Apr. 21, 2015

(87) PCT Pub. No.: WO2014/064009
PCT Pub. Date: May 1, 2014

(65) Prior Publication Data
US 2015/0273638 A1 Oct. 1, 2015

(30) Foreign Application Priority Data
Oct. 22, 2012 (DE) .................. 10 2012 219 254

(51) Int. Cl.
*H02K 33/00* (2006.01)
*H01L 41/00* (2013.01)
(Continued)

(52) U.S. Cl.
CPC .................. *B23Q 1/34* (2013.01); *B06B 1/06* (2013.01); *B23B 29/125* (2013.01); *B23B 31/02* (2013.01);
(Continued)

(58) Field of Classification Search
CPC ............ G01H 9/00; G01H 1/003; G01H 1/06; G01H 9/008
See application file for complete search history.

(56) References Cited

U.S. PATENT DOCUMENTS 3,608,648 A 9/1971 Dibble, Jr. et al.
4,640,156 A 2/1987 Nakagawa et al.
(Continued)

FOREIGN PATENT DOCUMENTS

DE 196 40 280 A1 4/1998
DE 10 2010 048 638 A1 1/2012
(Continued)

OTHER PUBLICATIONS

Notification of Reasons for Refusal dated May 17, 2016, issued in counterpart Japanese Patent Application No. 2015-537277, with English translation. (9 pages).
(Continued)

*Primary Examiner* — Bentsu Ro
*Assistant Examiner* — Zemanay Truneh
(74) *Attorney, Agent, or Firm* — Westerman, Hattori, Daniels & Adrian, LLP (57) ABSTRACT

In a method for machining a workpiece, a cutting tool is guided relative to the workpiece, with a vibration being superposed, the amplitude of which is at least 5 μm. A supply circuit for a piezo actuator of a vibrating tool generates a voltage at the voltage output, which has a direct component and an alternating component. A supply system for a piezo actuator of a vibrating tool has the above-mentioned supply circuit which is connected to a secondary coil that is coupled to a primary coil.

20 Claims, 6 Drawing Sheets

(51) Int. Cl.
    *B23Q 1/34*     (2006.01)
    *B23B 29/12*    (2006.01)
    *B23Q 5/027*    (2006.01)
    *B23B 31/02*    (2006.01)
    *B23B 35/00*    (2006.01)
    *B06B 1/06*     (2006.01)
    *H02P 25/032*   (2016.01)

(52) U.S. Cl.
    CPC .............. *B23B 35/00* (2013.01); *B23Q 5/027* (2013.01); *H02P 25/032* (2016.02); *B23B 2260/108* (2013.01); *Y10T 82/10* (2015.01); *Y10T 82/2531* (2015.01); *Y10T 408/03* (2015.01); *Y10T 408/23* (2015.01); *Y10T 409/303808* (2015.01); *Y10T 409/306664* (2015.01)

(56)            References Cited

U.S. PATENT DOCUMENTS

| | | | | |
|---|---|---|---|---|
| 5,327,073 | A * | 7/1994 | Hirai | ........................ H01F 38/14 |
| | | | | 323/362 |
| 5,947,658 | A | 9/1999 | Eysel | |
| 7,788,998 | B2 | 9/2010 | Ethington et al. | |
| 2001/0032514 | A1* | 10/2001 | Maruyama | ............... G01H 9/00 |
| | | | | 73/657 |
| 2006/0229004 | A1 | 10/2006 | Ohnishi | |
| 2007/0052326 | A1* | 3/2007 | Liu | ........................ B23B 29/125 |
| | | | | 310/323.18 |

FOREIGN PATENT DOCUMENTS

| | | |
|---|---|---|
| DE | 10 2010 048 636 A1 | 4/2012 |
| EP | 1 236 527 A1 | 9/2002 |
| EP | 1 137 511 B1 | 2/2004 |
| EP | 1 762 305 A2 | 3/2007 |
| JP | S62-99062 A | 5/1987 |
| JP | 2000-246524 A | 9/2000 |
| JP | 2002-36001 A | 2/2002 |
| JP | 2002-66801 A | 3/2002 |
| JP | 2002-301601 A | 10/2002 |
| JP | 2010-194614 A | 9/2010 |
| WO | 2008/118479 A1 | 10/2008 |

OTHER PUBLICATIONS

International Search Report dated Feb. 11, 2014 issued in correponding application No. PCT/EP2013/071861.

* cited by examiner

METHOD FOR MACHINING A WORKPIECE, SUPPLY CIRCUIT, SUPPLY SYSTEM, TOOL ACTUATOR, TOOL SETUP

The invention relates to a method for machining a workpiece, a supply circuit, a supply system, a tool actuator and a tool setup according to the preamble portions of the independent claims, respectively. Such a method has been known from DE 10 2010 048 638 A1.

In the case of the method described in DE 10 2010 048 638 A1 a vibration of a comparatively high frequency is superposed to a tool ("ultrasound"). The tool can be a milling cutter, a drill or a turning tool.

However, it has shown that for some materials and other marginal conditions of workpiece machining processes the high vibration frequencies and the relatively small vibration amplitudes are not particularly effective regarding the desired effects at the tool.

Similar technologies can be found in US 2006/0229004, EP 1 137 511 B1, EP 1 762 305 A2, WO 2008/118 479, DE 10 2010 048 636 A1.

It is the object of the invention to indicate a workpiece machining method as well as a tool or an actuator therefor, which make possible an efficient workpiece machining by means of a vibrating tool. Moreover, a supply circuit therefor is indicated.

These objects are achieved by the features of the independent claims. Dependent claims are directed to preferred embodiments of the invention.

In a method for machining a workpiece by means of a cutting tool, where the tool performs a working movement relative to the workpiece, to which a vibration is superposed, the vibration has an amplitude of at least 5 µm, preferably at least 10, 15 or 20 µm.

Additionally or alternatively thereto, the vibration has a working frequency which is detuned by at least 10%, preferably at least 20% or 30%, with respect to a mechanical resonance frequency of the vibrating system. The working frequency can lie in a range with a lower limit, which can be 500 Hz or 800 Hz, and/or an upper limit, which can be 1600 Hz or 1200 Hz.

The tool can be a drill, a milling cutter or a turning tool and the vibration can be a translational vibration. In the case of the drill and the milling cutter the vibration axis is axially parallel to the tool axis, and in the case of the turning tool it is parallel to the radial direction of the rotating workpiece.

As compared to the cited prior art, the mentioned working frequency is relatively low. It can lie in a range around 1 kHz. Vice versa, the amplitude is comparatively large. Its upper limit can lie at 30 µm or 50 µm or 100 µm. Having the mentioned values the superposed vibratory movement has a much stronger effect on the workpiece and, particularly, on the remaining workpiece surface in various machining contexts than it has been the case in the hitherto commonly used vibrations in the prior art. In particular, the surface appears to be less fissured, i.e. smoother, than it has been the case in the known machining methods.

A supply circuit for an actuator of a vibrating tool has a voltage generator which, at the voltage output, generates an output voltage having a direct component and an alternating component.

The voltage generator can receive alternating current and can have a capacitor C1 connected in series to the input and a half-wave rectifier in parallel to the mentioned series connection. The input voltage can be an alternating voltage which is inductively supplied without wires.

An actuator of a vibrating tool has a first mechanical connection at the machine side, a tool or a second mechanical connection for the same, an electrical vibration drive between the first connection and the tool or the second connection, a supply circuit, and an electrical connection between the supply circuit and the vibration drive. The vibration drive can generate a translational vibration and may have a piezo drive.

When the electromechanical transducer of the actuator is a piezo element, it must be considered that piezo elements are polar components, where reverse inputs of the driver voltage can lead to their deterioration or destruction, if these inputs are high in their amounts. Therefore, it is advantageous to operate piezo elements in only one polarity of the applied voltage, if possible, or, at any rate, to control one of the two possible polarities in such a way that the amplitudes (amount) remain as low as possible (or zero).

Just in the case of large vibration amplitudes relatively high amplitudes of the alternating voltage are desirable. In order to avoid, in this connection, a damage to or even a destruction of the piezo element, a driver voltage is generated where the alternating component oscillates around a direct component according to the desired vibration. Depending on the selected dimensions (direct component as compared to an alternating amplitude) a reversal of the polarity of the piezo element can be reduced or avoided.

The actuator can be located between the actual tool head (e.g. drill) and a drive component of a machine tool. The machine can be a CNC machine which uses standardized tools in such a way that their mechanical connections to the machine are standardized, e.g., according to HSK or the like. Towards the tool head itself a second mechanical connection/connector can also be provided, or the tool can be more or less firmly connected to the actuator itself in a releasable or unreleasable way.

The supply system for the actuator can comprise a circuit as illustrated above. The AC input of this circuit can be supplied inductively, i.e. eventually by a secondary coil that is magnetically coupled to a primary coil. The supply circuit is then provided in the tool itself and is moved together with the tool in accordance with the working movements of the latter (e.g. rotation of a drill).

In some embodiments, the supply system maintains that C3>100*C1 and C1>4*C2 can hold, with C2 being the effective capacity of the vibration drive, and/or maintains that ½<L1/L2<2, preferably L1=L2±10%.

In the following, individual embodiments of the invention are described with reference to the drawings.

In the following description same reference numerals are to denote same components. Features are to be regarded as combinable with each other, even if this is not expressly said, as far as their combination is not technically impossible or unreasonable. Descriptions of methods and method steps are also to be understood as descriptions of devices for implementing the respective method or method step, and vice versa.

Figure 1A:
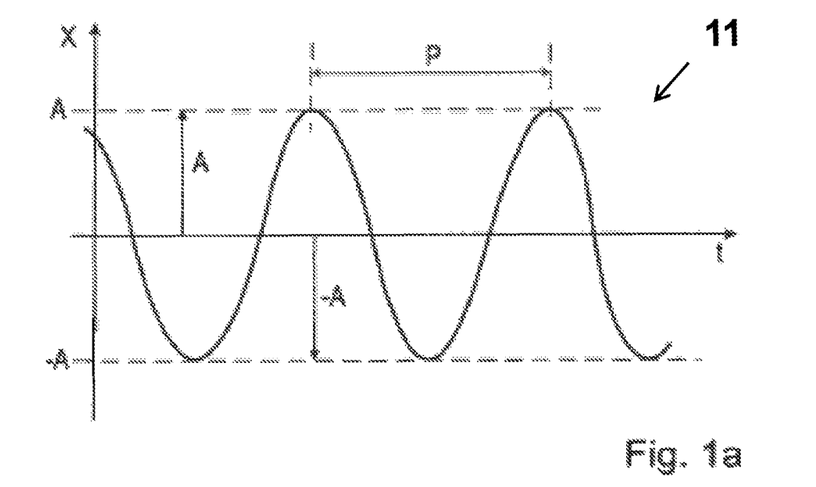
FIG. 1 shows diagrams for explaining mechanical properties of the desired vibration.

FIG. 1 schematically and qualitatively shows properties of the desired mechanical oscillations. FIG. 1a shows a vibration around a neutral position (central position). In the example of a drill, the vibration can be translational along the drill axis. What is shown is a sine-shaped mechanical oscillation. It can, however, be desired or it can automatically occur that the oscillation takes another form than the sine-shaped one. The mechanical oscillation has a working amplitude Aa around the central position. In this case, the extreme values are described by +Aa and −Aa. The amplitude Aa can be at least 5 μm, at least 10 μm or at least 20 μm. Its upper limit can be 30 or 50 or 100 μm.

These are comparatively high amplitudes which have hitherto not been considered in the prior art. The examinations of the inventors have, however, shown that, depending on materials and other operating parameters (rotational speed, desired surface quality, working speed, costs, etc.), other and, particularly, higher amplitudes than the previously favored relatively low amplitudes can be favorable for an advantageous workpiece machining. Correspondingly, the described working frequencies fa are relatively low. Such a vibrating tool will, in the case of a drill, increasingly compressively act on the current workpiece surface, so that this will yield desired surfaces just when the tool has terminated the workpiece machining.

In the case of a turning tool the vibration axis of a translational vibration can have a movement component which is radial with regard to the rotational axis of the workpiece, so that here, too, the turning tool translationally vibrates perpendicularly to the (current) workpiece surface.

A milling cutter can be made to vibrate along its rotational axis or at a right angle thereto and perpendicularly to the workpiece surface.

FIG. 1a shows a cycle duration P of a cyclic mechanical oscillation 11. Its reciprocal value corresponds to the oscillation frequency, also called working frequency fa. Generally, the working frequency can lie in a range with an upper limit of 5 kHz or 3 kHz or 2 kHz or 1.5 kHz. It can lie in a range with a lower limit of 200 Hz or 500 Hz or 800 Hz. It can be 1 kHz±10%.

It has turned out that such—as compared to the prior art relatively low—frequencies are well suited for advantageously machining workpieces when high machining speeds are desired. The advantage of the low working frequency also resides in the fact that it is sufficiently distant from resonance frequencies so that it becomes adjustable, for example in accordance with the feed rate. Just like the undesirable frequency shift in the case of frequency errors, the desired frequency shift in the case of a change of the frequency adjustment only has a small effect on the amplitude. The mentioned comparatively low frequencies and/or comparatively high amplitudes are advantageously chosen particularly when roughing processes are to be performed, i.e. when high cutting capacities are desired.

Insofar, the step of guiding the vibration frequency in accordance with the feed of the tool at the workpiece is then part of the working method.

Figure 1B:
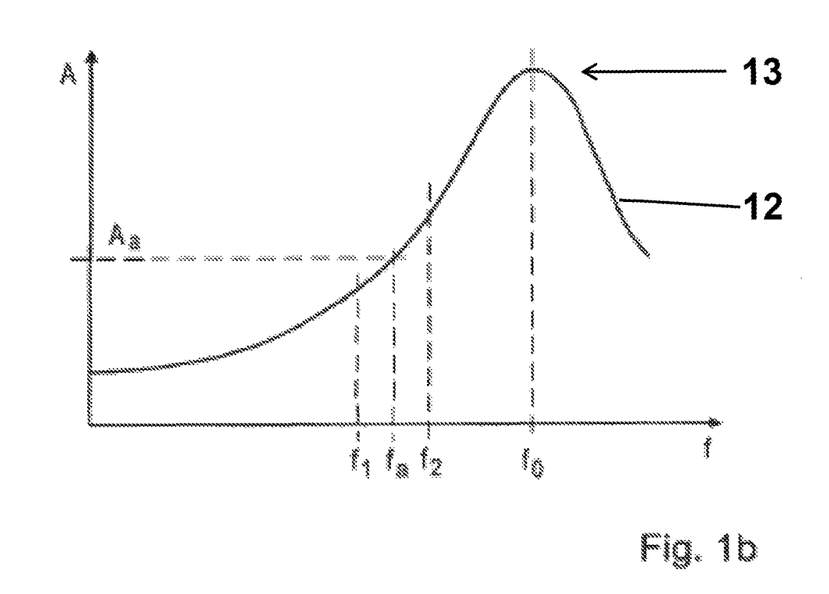

FIG. 1b shows frequency conditions. What is shown is the frequency response characteristic 12 of a tool excited to oscillate, i.e. a mechanical oscillation amplitude A in dependence of an excitation frequency f. The curve 12 has a maximum at 13, what corresponds to a resonance, i.e. an excitation with eigen-oscillation. Differently from what is common in the prior art, it is preferred to excite the tool outside of the resonance frequency f0, even if a vibration amplitude Aa of the excited vibration, which is as high as possible, is desired, what usually leads to an excitation at the resonance frequency, since there—according to the frequency response characteristic—the amplitude is comparatively large.

However, contrary to this apparent approach, according to the invention, in general when a workpiece is machined by means of a vibrating tool, the excitation frequency fa of the machining tool can be selected to be a value outside of the resonance frequency. The dimensioning can be such that the working frequency fa is detuned by at least 10%, preferably by at least 20% or at least 30%, with respect to a mechanical resonance frequency of the vibrating system. In particular, it can be smaller than the resonance frequency f0.

Resonance frequencies of vibrating tools can often be found in the range around f0=2 kHz. As compared thereto, working frequencies fa can be set within a range having a lower limit which can be 500 Hz or 800 Hz, and/or having an upper limit which can be 1600 Hz or 1200 Hz. In FIG. 1b lower limits f1 and f2 are shown; threshold values of the respectively generated amplitudes A1 and A2 correspond to these lower limits.

The reason for the detuning of the working frequency fa with respect to the resonance frequency f0 resides in the fact that outside of the resonance step-up the amplitude acting at the workpiece is less sensitive to errors from frequency detunings of the driver frequency. Close to the resonance frequency f0 the characteristic curve is comparatively steep, so that small frequency errors lead to relatively large amplitude errors and, thus, to unforeseen conditions in the workpiece machining.

As compared thereto, the conditions away from the resonance frequency f0 are less critical regarding frequency errors, since the frequency response characteristic of the amplitude A is less steep. The same frequency error away from the resonance frequency causes a smaller amplitude error than just this error close to the resonance frequency.

The rotational speed of a drill or a milling cutter can lie in a range with a lower limit, which is 10,000 rev/min or 15,000 rev/min, and/or with an upper limit, which can be 30,000 rev/min or 25,000 rev/min.

Figure 4:
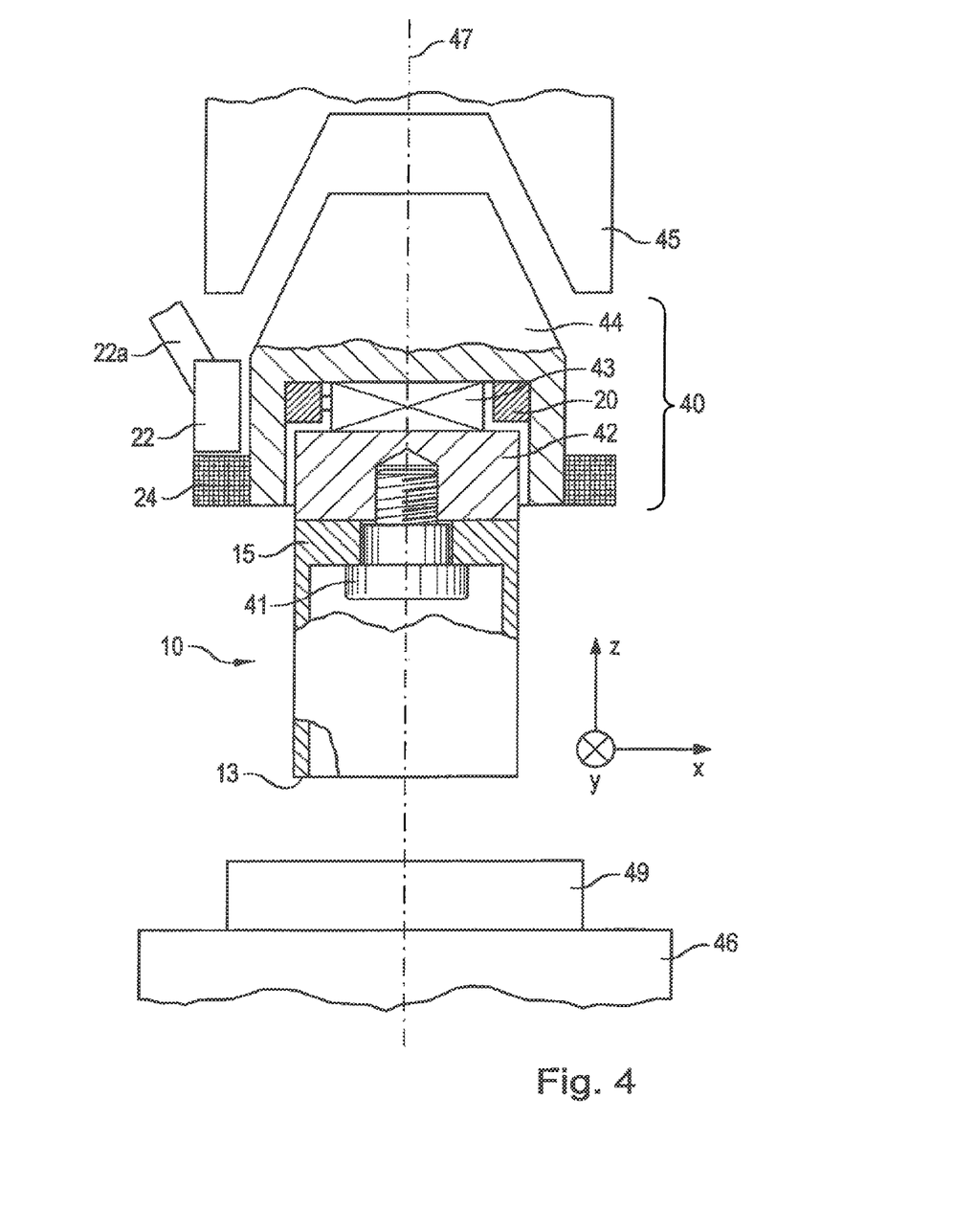

FIG. 2 shows circuits for the energy supply of the vibration drive. It can be a piezo element or comprise one. In FIG. 4 it is symbolized by 43. In the circuit diagrams of FIG. 2 it is shown at the very bottom, respectively, in accordance with its electrical effect as a capacitor.

It is assumed that the energy supply is wireless. In addition to the vibration, the tool also effects a conventional working movement, e.g. in the case of a drill a rotation about the axis. It has been a known technology to effect the energy transfer from the stationary to the moving part by means of sliding contacts. However, with regard to wear, this is disadvantageous.

If the wear is not to be tolerated, a wireless energy transfer is chosen, where a primary coil is magnetically coupled to one or more secondary coils. The primary coil is supplied with an alternating voltage and, accordingly, generates a magnetic alternating field which induces an alternating voltage in the secondary coil(s). The primary coil is intended to be stationary, whereas the secondary coil is provided together with the tool setup and can be firmly mounted thereto.

Figure 2A:
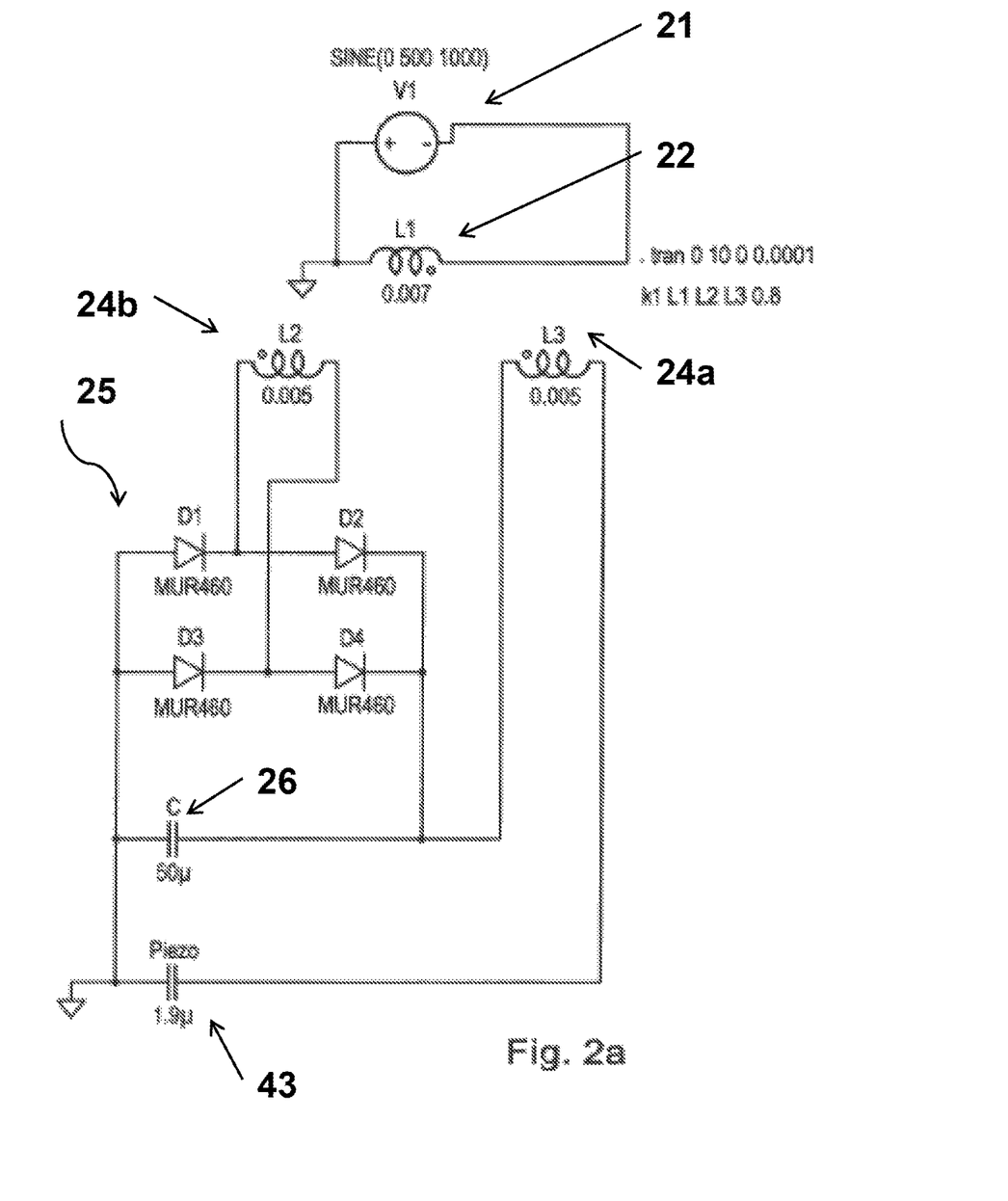
FIG. 2 shows circuit diagrams of a supply circuit.

FIG. 2a shows the stationary alternating voltage source 21 which is connected to a primary coil 22. These components are stationary. Moreover, two secondary coils 24a and 24b are provided which move together with the tool. In particular, they rotate when the tool is rotationally driven. One 24b of the secondary coils feeds a full wave rectifier 25, the rectified output of which is smoothed by means of a capacitor 26. In this way a pulsating direct voltage comes into existence. The other secondary coil 24a generates an alternating voltage which is connected in series with the rectified and smoothed output voltage at the capacitor 26. In this way a direct voltage comes into existence, to which a distinct alternating voltage is superposed. It is then applied to the piezo actuator designated by 43 and symbolized as a capacitor.

In the case of this circuit, however, there is the risk that the secondary coils 24a and 24b retroactively mutually influence each other, so that undefined conditions can occur. Insofar the circuit of FIG. 2a can be employed particularly when the energy supply is not performed inductively, but can be picked up in a conventional way.

Figure 2B:
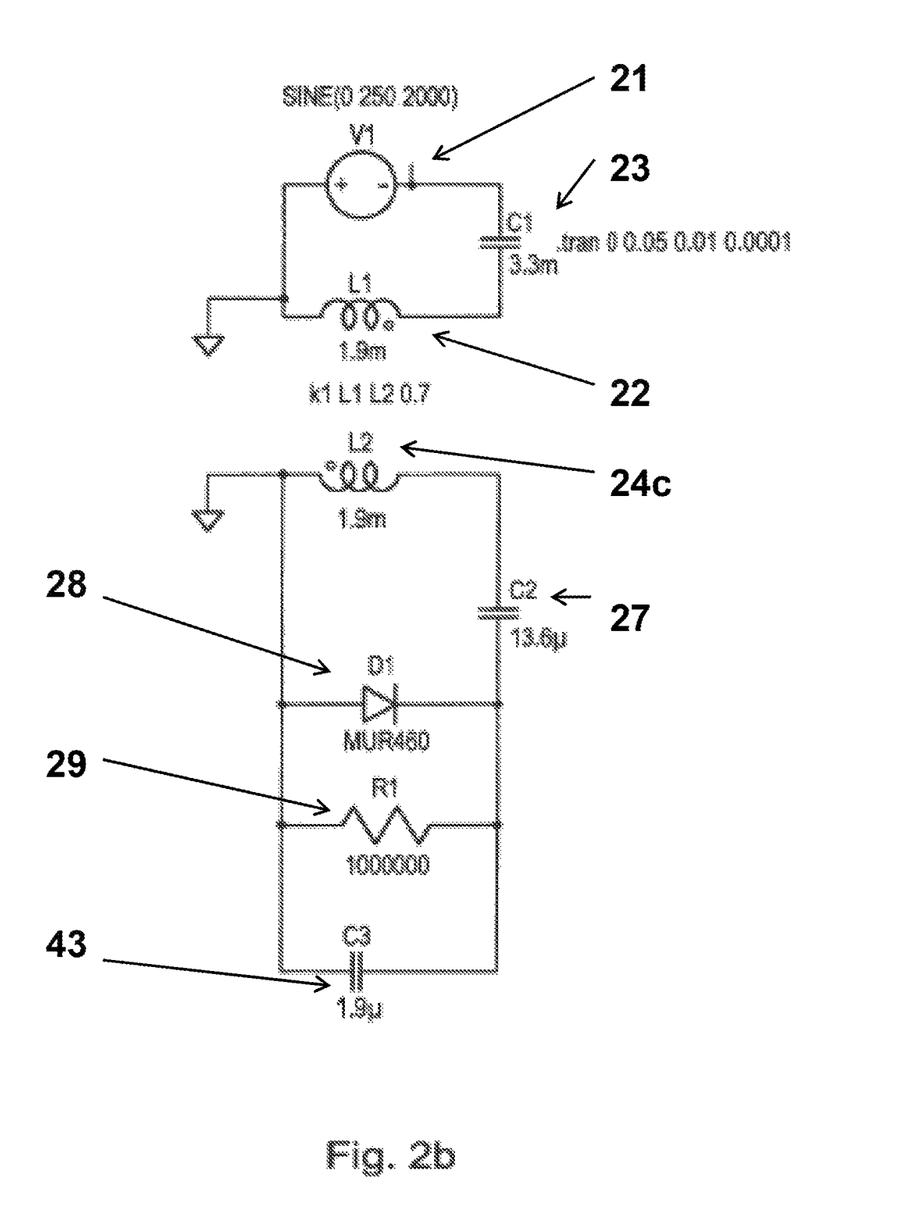

FIG. 2b shows another circuit for the wireless energy transfer. Between the stationary alternating voltage source 21 and the primary coil 22 a serial capacitor 23 can be provided as a DC block. It has large dimensions and can have a capacity of more than 1 mF or more than 3 mF. At the secondary side, a secondary coil 24c is provided which feeds a series connection of two circuit parts. The one circuit part is a conventional diode 28 which is used as a half-wave rectifier. The other circuit part is a capacitor 27 or comprises the same. In parallel to the diode 28 or to the first circuit part a resistor 29 can be provided. At the diode or at the first circuit part the supply voltage for the piezo actuator 43 can be picked up.

The half-wave rectifier 28 cuts off a half-wave of the alternating voltage at the secondary coil and voltages below the forward threshold of the diode, so that the part which has been allowed to pass through is no longer symmetrical around zero. It therefore comprises a direct component. The piezo drive 43 acting as a capacitance can act, on the one hand, as an alternating current impedance which, yet, allows a part of the alternating voltage to pass through, but which, on the other hand, will also smooth the output voltage at the rectifier 28, so that there is applied an approximately sine-wave voltage to the rectifier and, thus, also to the piezo drive 43 itself.

The fact that the half-wave rectifier 28 does not only block the reverse voltage polarity, but also, in forward direction, voltage amounts below the forward voltage of the diode, is compensated by the impedance of the piezo element 43 itself in dependence of the dimensions, since this impedance acts as a finite alternating current impedance in accordance with $1/(j\omega C)$. In the case of a suitable dimensioning a total voltage can come into existence, the minimum value of which is zero and the maximum value of which in forward direction of the diode 28 approximately corresponds to twice the alternating voltage amplitude.

Figure 3:
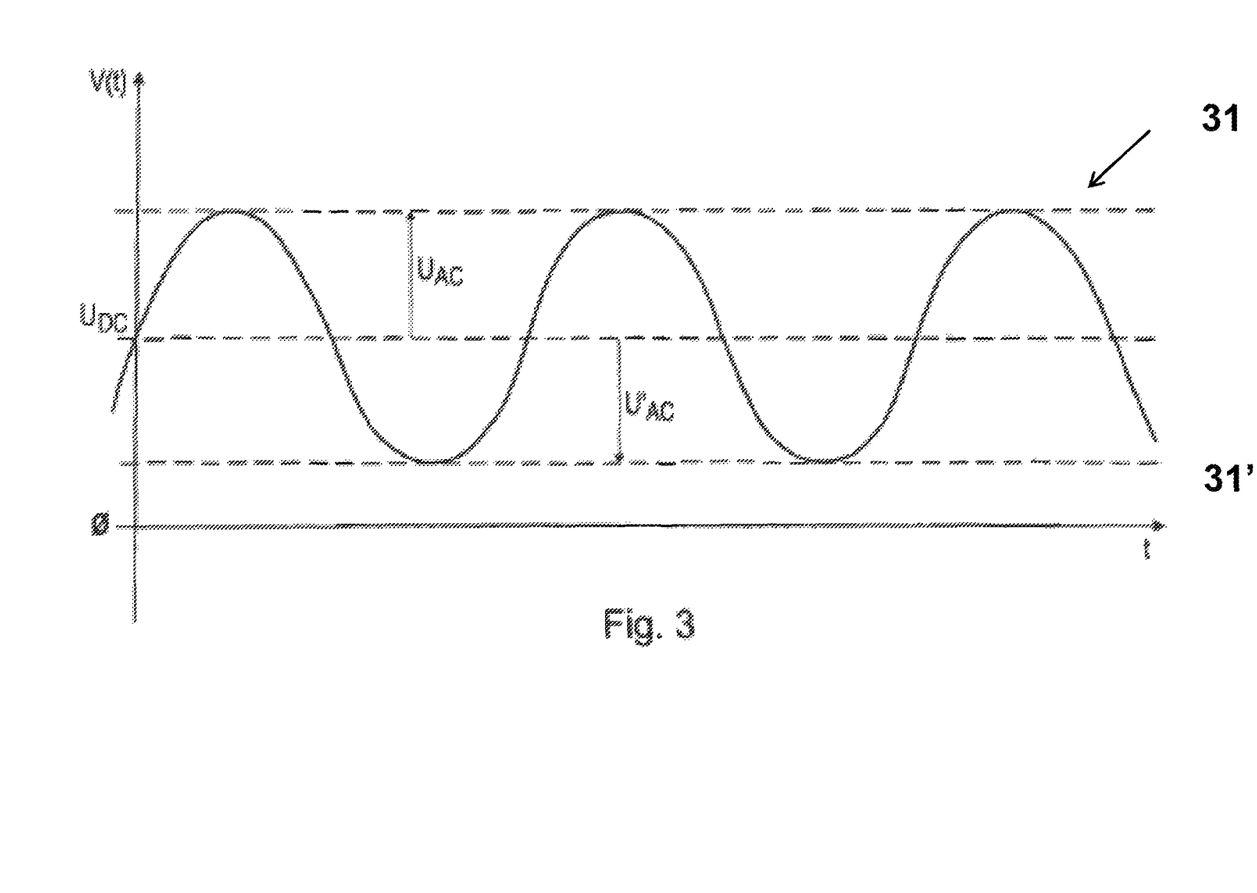
FIG. 3 shows an electrical signal, FIG. 4 schematically shows a tool in a machine.

FIG. 3 shows a possible time curve of the voltage at the diode 28 or at the second circuit part. The time curve 31 can be more or less sine-shaped. Depending on the symmetry of the time curve, the direct component Udc lies approximately in the middle between the maximum value and the minimum value of the alternating component Uac. The solid line shows a course which constantly lies above the zero line. The broken line 31' indicates a course which reaches down to the zero line. This course can also drop below the zero line and, then, lead to pole reversals of the piezo element. They are uncritical as long as the inverted voltage remains below specific thresholds with regard to amounts. This is ensured by the superposed direct component Udc.

The advantage of the circuit of FIG. 2b is that it has a simple structure and that it only needs a secondary picking-up for generating both, a direct voltage Udc and an alternating voltage Uac, so that interactions as they were found in the circuit of FIG. 2a cannot occur.

The secondary coil(s) is/are preferably rotationally symmetrical relative to the rotational axis of the tool. The rotation of the tool during operation does not generate a change or generates only a small change of the flow flooding the coil, so that the rotational speed does not have any effect or only a small effect on the secondarily induced voltage. Rather, the frequency and the amplitude of the secondary voltage then become adjustable by appropriate control of the electric values at the primary side, without the rotational speed of the tool influencing this.

However, if desired, the secondary coil can also be arranged in such a way that the rotation of the tool influences the magnetic flux flooding the coil, so that the tool rotation influences the secondary voltage.

The direct voltage component Udc can be at least half of the amplitude Uac of the alternating component. It is preferably equal to the amplitude Uac ±4% of Uac or ±1% of Uac.

A supply system for an actuator of a vibrating tool has a supply circuit 28, 29 as described above, one or more secondary coils as described above, a primary coil 22 and an alternating voltage source 21. The already mentioned capacitor 23 can also be provided. The capacitor 23 can have a value which is at least 100 times the value of the capacitor 27. The latter, in turn, can be dimensioned in such a way that its value is at least four times the equivalent capacity of the piezo drive 43. It can also be two times or at least three times and/or possibly maximally ten times or maximally twenty times the equivalent capacity. The primary coil can be provided near the rotating machine spindle. However, it is generally stationary.

FIG. 4 schematically shows an actuator 40 for a tool. It has a machine-side connection 44 by means of which the actuator can be coupled to the rotating spindle 45 of a machine tool. The connection can correspond to a standard, e.g. to HSK. Furthermore, a tool-side connection 42 is provided to which the tool is or can be mounted. What is shown is an embodiment where a tool 10 can be fastened in place by a screw 41. The tool-side connection 42 itself can be exchanged for one of the same type or of a different type, i.e. can be releasable from and connectable to the actuator. Thus, tools with different connections can be used.

43 symbolizes the vibration drive which can be designed as a piezo drive. It is effective between the machine-side connection 44 and the tool-side connection 42. 24 symbolizes the secondary coils 24 in the circuits of FIG. 2. It can be arranged all around the circumference of the actuator. 22 symbolizes a primary coil corresponding to 22 in FIG. 2. 22a symbolizes a holding means for holding the primary coil at the stationary part of the machine.

The supply circuit 20 is accommodated at a suitable place of the actuator. In order to avoid imbalances it can be provided distributed around the circumference, or it is balanced with counter-weights. 47 is the rotational axis of the actuator together with the tool 10 which can be fastened in place by the screw 41. The spindle 45, too, rotates about the axis 47. 49 symbolizes a workpiece. 46 symbolizes a workpiece table. The secondary coil 24 is electrically connected to the supply circuit 20 which, in turn, is electrically connected to the drive 43.

The mechanical system and the electrical system of the actuator are designed in such a way that the actuator generates the quantities initially described as to the machining method. In particular, the piezo drive 43 and the electrical system are designed in such a way that vibration amplitudes of the desired size come about. The vibration frequency is adjusted, as explained above, preferably by adjusting the primary-side excitation frequency.

A tool setup comprises the actuator 40 as described above and a tool 10. The tool 10 is suitably mounted to the actuator 40. What is shown in FIG. 4 is a connection by means of a screw 41. The tool can be a special tool for the vibratory machining of a workpiece, e.g., as is shown, a hollow-cylindrical structure with tool-side grinding attachment, or it can be a more or less conventional tool. The fixture of the tool 10 at the actuator 40 can be specialized or standardized. The tool preferably is a drill or a milling cutter or a turning tool.

Previously, translational vibrations along an axis have been described. The same considerations as were made above are also valid for rotational vibrations of drills or milling cutters about their rotational axes. For rotational vibrations the frequency indications as mentioned above are valid, too. The amplitude data are those at the respectively largest cutting radius of the tool. For rotational vibrations the actuator 40 and, particularly, the vibration drive can be constructed differently from what is shown in FIG. 4. However, there may also be provided a piezo actuator. The supply circuit can be the same.

Figure 5:
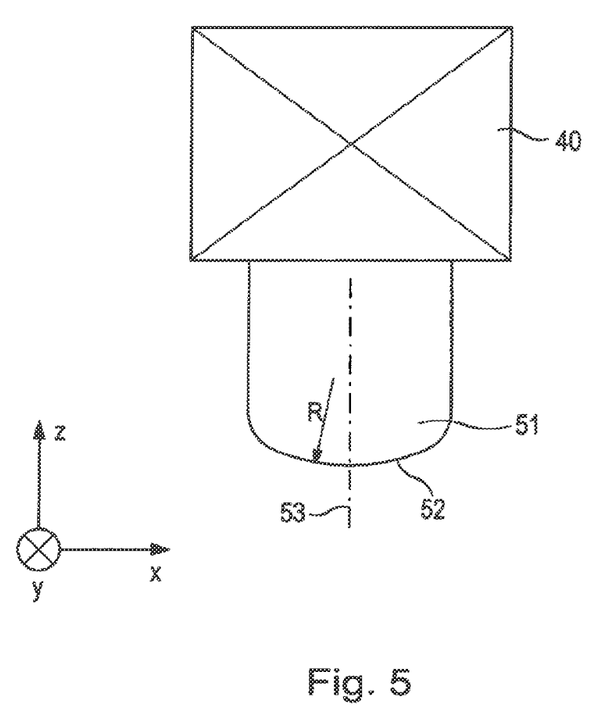
FIG. 5 shows a tool.

FIG. 5 shows a tool 51 for the workpiece machining. The machining is a compacting (impact compaction, "patting down") of a possibly previously otherwise machined surface of a workpiece of relatively ductile material, in particular a metallic material, e.g. aluminum and its alloys. The tool is or can be connected to a vibration actuator 40 which may have a structure as described. The vibration has a movement component perpendicular to the workpiece surface. It can be a translational vibration perpendicular to the workpiece surface in accordance with the previously described marginal conditions (vibration frequency, amplitude).

The tool 51 has a surface 52 facing the workpiece, which does not have any edges or blades. It can be relatively smooth. It can be rotationally symmetrical about the axis 53 in the direction towards the workpiece. In certain areas it can be designed as a sec of a surface of a sphere having the radius R and, rearward (in FIG. 5 above, in the direction towards the machine), it can transition into a suitable mounting range towards the actuator 40 or can be constantly mounted to the actuator. The radius of the sphere can lie in a range having a lower limit of 0.5 mm or 1 mm or 2 mm and/or having an upper limit of 20 mm or 10 mm or 5 mm. The surface 52 can also be plane in certain areas (not shown) and can have suitable chamferings at the edges.

During the machining process the tool vibrates and is guided by means of machine components across the surface of the workpiece in engagement therewith. It can be operated without a rotation about the axis 53. Then, the vibration and the guiding movement are the only movements.

Generally, the machine has a control system which adjusts the described quantities and performs steps. It can operate depending on a program and, possibly, it can also operate in a closed-loop controlled manner or an open-loop controlled manner in accordance with sensor signals.

The invention claimed is:

1. A method for machining a workpiece by means of a cutting tool, comprising:
   providing the cutting tool as a drill, a milling cutter, a turning tool, or a grinding tool,
   performing a working movement with the cutting tool relative to the workpiece, while superposing a vibration,
   providing the vibration with an amplitude of at least 5 μm, and
   detuning a working frequency of the vibration by at least 10% with respect to a mechanical resonance frequency of the cutting tool's vibrating system.

2. The method for machining a workpiece by means of a cutting tool according to claim 1, where the tool performs a working movement relative to the workpiece, to which a vibration is superposed, further comprising that
   the vibration has a working frequency in a range with a lower limit of 500 Hz and with an upper limit of 1600 Hz.

3. The method according to claim 2, wherein the tool is a drill, a milling cutter or a turning tool, and the vibration is a translational vibration, in the case of the drill and the milling cutter the vibration axis being axially parallel to the tool axis and the vibration being a translational and/or a rotational vibration, and in the case of the turning tool the vibration axis being in parallel to the radial direction of the rotating workpiece.

4. The method according to claim 1, wherein the vibration is a translational vibration, in the case of the drill and the milling cutter the vibration axis being axially parallel to the tool axis and the vibration being a translational and/or a rotational vibration, and in the case of the turning tool the vibration axis being in parallel to the radial direction of the rotating workpiece.

5. The method according to claim 1, further including that the tool is a vibrating tool and that a supply circuit for an actuator of the vibrating tool is provided that comprises
   an alternating current input,
   a first circuit part at a connection of the alternating current input with a capacitor,
   a second circuit part with a half-wave rectifier being in parallel to the series-connection of alternating current input and first circuit part, and
   a voltage pick-up for the voltage along the second circuit part as a voltage output.

6. The method according to claim 5, further including that the supply circuit further comprises a resistor in parallel to the half-wave rectifier.

7. The method according to claim 6, further including that the supply circuit further comprises a secondary coil which is connected to the alternating current input.

8. The method according to claim 6, further including that the supply circuit further includes that the voltage at the voltage output has
   a direct voltage component, and/or
   an alternating component.

9. The method according to claim 5, further including that the supply circuit further comprises a secondary coil which is connected to the alternating current input.

10. The method according to claim 5, further including that the supply circuit further includes that the voltage at the voltage output has
    a direct voltage component, and/or
    an alternating component.

11. The method according to claim 1, further including that the tool is a vibrating tool and that a supply circuit for an actuator of the vibrating tool is provided that comprises
    an alternating current input,
    a voltage generator which is connected to the alternating current input and has a voltage output and which is designed to have a direct component and an alternating component for generating a voltage at the voltage output.

12. The method according to claim 11, further including that the supply circuit further comprises a secondary coil which is connected to the alternating current input.

13. The method according to claim 1, further including that the tool is a vibrating tool and that a supply system for an actuator of a vibrating tool is provided that includes a supply circuit that includes
an alternating current input,
a first circuit part at a connection of the alternating current input with a capacitor,
a second circuit part with a half-wave rectifier being in parallel to the series-connection of alternating current input and first circuit part,
a voltage pick-up for the voltage along the second circuit part as a voltage output, and
a secondary coil which is connected to the alternating current input,
a primary coil magnetically coupled to the secondary coil, and
a series-connection including an alternating current source and a third capacitor in parallel to the primary coil.

14. The method according to claim 1, further including that the tool is a vibrating tool and that an actuator of the vibrating tool is provided that includes
a first mechanical connection at the side of the machine,
a tool or a second mechanical connection for the latter,
an electrical vibration drive between the first connection and the tool or the second connection,
a supply circuit that includes
an alternating current input,
a first circuit part at a connection of the alternating current input with a capacitor,
a second circuit part with a half-wave rectifier being in parallel to the series-connection of alternating current input and first circuit part,
a voltage pick-up for the voltage along the second circuit part as a voltage output, and
an electrical connection between the supply circuit and the vibration drive.

15. The method according to claim 14, further including that the actuator further includes
the supply circuit further includes a secondary coil which is connected to the alternating current input, and
a rotational axis, around which the secondary coil is arranged,
wherein the first connection is a standardized connection.

16. The method according to claim 14, further including that the actuator further includes that the vibration drive generates a translational vibration.

17. The method according to claim 14, further including that the actuator is configured to generate a mechanical vibration amplitude of at least 10 μm with the electrical frequency of the supply voltage being detuned with respect to a mechanical resonance frequency of the actuator and tool by at least 20% of the resonance frequency.

18. The method according to claim 1, further including that the tool includes
an actuator or a mounting area for an actuator, and
a surface facing the workpiece during operation, which has no blade and is rounded or has chamfered edges.

19. The method according to claim 1, further including detuning the working frequency by at least 20% with respect to a mechanical resonance frequency of the vibrating system.

20. The method according to claim 1, further including detuning the working frequency by at least 30% with respect to a mechanical resonance frequency of the vibrating system.

* * * * *